(12) United States Patent
Savioz et al.

(10) Patent No.: US 12,458,054 B2
(45) Date of Patent: Nov. 4, 2025

(54) APPARATUS AND METHOD FOR ROASTING COFFEE BEANS

(71) Applicant: SOCIETE DES PRODUITS NESTLE S.A., Vevey (CH)

(72) Inventors: Gregory Savioz, Saxonne (CH); Frank Rousselin, Reaumont (FR); Ghislain Janet Maitre, Beaucroissant (FR); Jonathan Del Rey, Voiron (FR)

(73) Assignee: Société des Produits Nestlé S.A., Vevey (CH)

( * ) Notice: Subject to any disclaimer, the term of this patent is extended or adjusted under 35 U.S.C. 154(b) by 439 days.

(21) Appl. No.: 18/001,100

(22) PCT Filed: May 17, 2021

(86) PCT No.: PCT/EP2021/062917
§ 371 (c)(1),
(2) Date: Dec. 8, 2022

(87) PCT Pub. No.: WO2021/249723
PCT Pub. Date: Dec. 16, 2021

(65) Prior Publication Data
US 2023/0210158 A1 Jul. 6, 2023

(30) Foreign Application Priority Data

Jun. 10, 2020 (EP) ..................... 20179357

(51) Int. Cl.
*A23N 12/08* (2006.01)
*A23F 5/04* (2006.01)
(Continued)

(52) U.S. Cl.
CPC ............ *A23N 12/125* (2013.01); *A23F 5/046* (2013.01); *A23L 5/17* (2016.08); *A23N 12/083* (2013.01);
(Continued)

(58) Field of Classification Search
CPC ......... A23F 5/04–06; A23N 12/08–125; A23L 5/17; A47J 37/04–2037/0795; A47J 31/42; A47J 4/52
See application file for complete search history.

(56) References Cited

U.S. PATENT DOCUMENTS 1,516,135 A * 11/1924 Barnard ................. A23L 7/187
99/323.9
1,692,432 A * 11/1928 Webster ................. A23L 7/187
99/323.9
(Continued)

FOREIGN PATENT DOCUMENTS

CN 203353580 U 12/2013
FR 2645716 A1 10/1990
(Continued)

OTHER PUBLICATIONS

Translation of RU 124537U1 (Year: 2013).*
(Continued)

*Primary Examiner* — Drew E Becker
(74) *Attorney, Agent, or Firm* — Thorpe North & Western, LLP (57) ABSTRACT

The invention relates to an apparatus (1) and a method for more convenient roasting of coffee beans. The apparatus (1), which is provided for roasting coffee beans, comprises: a chamber (10) in which coffee beans can be received for roasting, wherein the chamber (10) comprises an opening (13), and a device for roasting the coffee beans received in the chamber (10). The chamber (10) is movable with respect to a movement axis into different positions, wherein these positions comprise a roasting position, preferably a bean reception position, and a bean discharge position, wherein in the roasting position the device is arranged to roast the coffee beans received in the chamber (10), in the bean reception position, if present, the chamber (10) is arranged
(Continued)

to receive, via the opening (13), coffee beans for subsequent roasting in the roasting position, and in the bean discharge position the chamber (10) is arranged such that the coffee beans can be discharged via the opening (13) from the chamber (10).

13 Claims, 4 Drawing Sheets (51) Int. Cl.
    *A23L 5/10*     (2016.01)
    *A23N 12/10*     (2006.01)
    *A23N 12/12*     (2006.01)
    *A47J 31/42*     (2006.01)
    *A47J 42/52*     (2006.01)

(52) U.S. Cl.
    CPC .............. *A23N 12/10* (2013.01); *A47J 31/42* (2013.01); *A47J 42/52* (2013.01)

(56) References Cited

U.S. PATENT DOCUMENTS

| | | | | |
|---|---|---|---|---|
| 1,987,388 | A * | 1/1935 | Cretors | A23L 7/187 99/476 |
| 2,027,146 | A * | 1/1936 | Bly | A47J 37/047 451/328 |
| 2,809,576 | A * | 10/1957 | Von Edeskuty | A23L 7/178 89/44.01 |
| 2,939,383 | A * | 6/1960 | Kanaga | A47J 37/047 99/341 |
| 3,334,575 | A * | 8/1967 | Erwin | A21B 5/00 416/177 |
| 3,615,668 | A * | 10/1971 | Smith, Jr. | A23N 12/08 99/469 |
| 4,484,064 | A | 11/1984 | Murray | |
| 4,895,308 | A | 1/1990 | Tanaka | |
| 5,185,171 | A * | 2/1993 | Bersten | A23F 5/046 34/360 |
| 5,632,098 | A | 5/1997 | Finch | |
| 6,123,971 | A | 9/2000 | Tidland | |
| 6,173,506 | B1 * | 1/2001 | Kruepke | A23N 12/083 34/68 |
| 6,260,479 | B1 * | 7/2001 | Friedrich | A23N 12/08 34/594 |
| 6,299,922 | B1 * | 10/2001 | Bichsel | A23P 30/36 426/450 |
| 10,098,504 | B2 * | 10/2018 | Benitez | A21D 13/42 |
| 10,765,137 | B1 * | 9/2020 | Hart | A23N 12/08 |
| 2010/0051602 | A1 | 3/2010 | Beardsley et al. | |
| 2016/0353793 | A1 * | 12/2016 | Montoya | B08B 9/08 |
| 2019/0133377 | A1 | 5/2019 | Mccullough et al. | |

FOREIGN PATENT DOCUMENTS

| | | | |
|---|---|---|---|
| GB | 2197178 | A | 5/1988 |
| JP | S6087738 | A | 5/1985 |
| JP | H01153041 | A | 6/1989 |
| JP | H01190319 | A | 7/1989 |
| JP | 2000220849 | A | 8/2000 |
| JP | 2000279151 | A | 10/2000 |
| JP | 2014140328 | A | 8/2014 |
| RU | 124537 | U1 | 2/2013 |

OTHER PUBLICATIONS

Translation of JPH01153041A (Year: 1989).*
Russian Office Action for Appl No. 2022132091/10 dated Aug. 20, 2024, 7 pages.
Chinese Office Action for Appl No. 202180040128.9 dated Sep. 11, 2024, 9 pages.

* cited by examiner

APPARATUS AND METHOD FOR ROASTING COFFEE BEANS

1. FIELD OF THE INVENTION

The present invention relates to an apparatus for roasting coffee beans and to a method for roasting coffee beans.

2. TECHNICAL BACKGROUND

Roasting coffee beans transforms unroasted coffee beans into roasted coffee beans. The unroasted coffee beans are typically green and/or dried coffee beans, and the roasted coffee beans particularly contribute to the flavor of the coffee beverage, which is prepared from the (grinded) roasted coffee beans. Roasting the coffee beans can be on a large scale, but also on a small scale. In small scale roasting of coffee beans, the business to the customer (a shop, a coffee shop, etc.) or a customer, e.g. the consumer of the coffee beverage, roasts the coffee beans. Roasting coffee beans by the consumer is very interesting, since the consumer can roast the coffee beans at home in order to experiment with different flavor profiles and in order to ensure a particularly fresh roast of the coffee beans, for example as a hobby.

In order to roast the coffee beans, several handling steps need to be carried out. For example, filling of the coffee beans needs to be carried out in order to subsequently roast the coffee beans, and the coffee beans need to be handled, when roasting of the coffee beans is finished. This may require the manipulation of several parts of an apparatus, which is not very convenient for the user. These parts may be also hot parts so that there is also the risk that the user of the apparatus gets hurt during the manipulation. Further, the roasting of the coffee beans may require the provision of certain measures before the roasting of the coffee beans can be started. This may also involve the manipulation of several parts of the apparatus, making the roasting of the coffee beans not very convenient and, due to the possibly hot parts to be manipulated, relatively unsafe.

Therefore, it is an object of the present invention to provide an apparatus and a method, which overcome the afore-mentioned drawbacks. That is, it is in particular an object of the present invention to provide an apparatus, which make the process of roasting coffee beans more convenient and safer.

These and other objects, which become apparent upon reading the following description, are solved by the subject matter of the independent claims. The dependent claims refer to preferred embodiments of the invention.

3. SUMMARY OF THE INVENTION

According to the invention, an apparatus for roasting coffee beans is provided. The apparatus comprises: a chamber in which coffee beans can be received for roasting, wherein the chamber comprises an opening, and a device for roasting the coffee beans received in the chamber. The chamber is movable with respect to a movement axis into (at least two, preferably at least three) different positions, wherein these positions comprise (or are, i.e. consist of) a roasting position, preferably a bean reception position, and a bean discharge position. In the roasting position, the device is arranged to roast the coffee beans received in the chamber; in the optional bean reception position, the chamber is arranged to receive, via the opening, coffee beans for subsequent roasting in the roasting position; in the bean discharge position, the chamber is arranged such that the coffee beans can be discharged via the opening from the chamber.

The apparatus thus facilitates that the chamber needs to be moved only with respect to the movement axis in order to be moved into each of the roasting position, the optional bean reception position, and the bean discharge (i.e. ejection) position. That is, with only one specific manner or type of movement (such as linear or rotational, i.e. tilting) of the chamber with respect to the movement axis the chamber can be moved into the desired position. During the movement of the chamber, the chamber thus moves relative to a part of the apparatus, which is, for example, provided for positioning and/or mounting the apparatus, such as the bottom of the apparatus.

The apparatus therefore effects that the overall process of coffee roasting, including in this order at least coffee bean reception (i.e. filling), coffee bean roasting and coffee bean discharging, is improved, in particular with respect to the convenience (quicker and more direct access to the (roasted) coffee beans, etc.) and safety (less injuries due to touching possibly hot parts of the apparatus, etc.). This in particular because the user of the apparatus is not required to make a plurality of manipulations in order to move the chamber into the respective position in order to carry out the function of the respective position. Also, the chamber, which is movable with respect to the fixed movement axis, decreases the chances of undesired losing of coffee beans or parts of the apparatus.

The different positions are dedicated positions, i.e. positions, which are defined by the apparatus. The apparatus may be configured to stop or brake the chamber, when the chamber is in each of the different positions. For example, the apparatus may comprise one or more stop elements in order to stop the chamber in one or more of the different positions. Each of the one or more stop elements may be arranged to allow a movement of the chamber with respect to the movement axis in a first direction and to not allow a movement of the chamber with respect to the movement axis in a second direction, which is opposite to the first direction. The apparatus may be configured to stop the chamber, when the chamber is in each of the roasting position and/or bean discharge position. Thus, the apparatus may comprise for each of the roasting position and/or bean discharge position a respective stop element.

The apparatus may comprise one or more braking elements in order to brake the chamber in one or more of the different positions. Each of the one or more braking elements may be arranged to stop a movement of the chamber with respect to the movement axis in a specific direction, when a force for accordingly moving the chamber (e.g. a manipulation force) is below a defined threshold value. When this force for accordingly moving the chamber is at or above the defined threshold value, the one or more braking elements may be arranged to allow the movement of the chamber in said specific direction. The apparatus may be configured to brake the chamber, when the chamber is in the bean reception position. Thus, the apparatus may comprise for the bean reception position a braking element.

The chamber may be rotatably movable into the different positions. Therefore, the chamber can be very easily moved into each of the different positions, namely by only a rotational movement about the movement axis being a rotational movement axis, i.e. by tilting the chamber. The movement axis may extend horizontally. The horizontally extending movement axis therefore in particular effects that the opening can be tilted upwards and downwards, respectively. Thus, gravity can be effectively used for moving the coffee beans with respect to the chamber.

The chamber may be adapted to move manually into each of the different positions. For example, the apparatus comprises a user interface, such as a handle and/or a knob, for manually moving the chamber into each of the different positions. Therefore, a user of the apparatus may easily and intuitively move the chamber into each of the different positions, for example by only a clockwise and an anti-clockwise movement of the user interface. Additionally or alternatively, the chamber is adapted to move automatically into each of the different positions. For example, the apparatus comprises a control unit and a driving unit for automatically moving the chamber into the different positions, wherein the driving unit is functionally connected to the control unit. The control unit may then control the driving unit, for example based on the roasting process, in order to automatically move the chamber into each of the different positions. As such, the convenience of operating the apparatus is improved, since less or even no user manipulations for moving the chamber are required.

The apparatus may comprise a mating part, such as a lid and/or a coffee chaffs collector, for covering and preferably engaging with the opening in the roasting position in order to close and preferably seal the chamber for roasting the coffee beans. The mating part therefore in particular ensures that during the roasting process in the roasting position no air (such as hot air) and/or no by-products of the coffee roasting (such as smoke, dirt, coffee chaffs, etc.) can escape from the chamber via the opening, in particular to an outside of the apparatus. The mating part may be designed such that said air and/or by-products can escape from the chamber only through the mating part. The mating part thus particularly provides a safer apparatus. The mating part may be designed correspondingly or complementary to the opening respectively sidewall of the chamber defining the opening.

The opening may be arranged such that, when the chamber moves into the roasting position, the opening moves towards the mating part in order to come into an engagement, preferably a sealing engagement, with the mating part in the roasting position. Thus, only the movement of the chamber with respect to the movement axis effects the engagement, in particular the required force for the sealing engagement, of the opening with the mating part. In other words, no movable parts other than the movable chamber may be required for bringing the opening into the (sealing) engagement.

When the chamber is in the roasting position, the mating part and the opening may be relatively movable to one another so that the opening and the mating part can come into an engagement with one another, preferably a sealing engagement. The apparatus may therefore comprise, besides the movement axis of the chamber, one or more further movement axes, preferably only one further movement axis, for the relative movement between the mating part and the opening. For example, in the roasting position (in which the chamber therefore does not move with respect to the (first) movement axis) the mating part may remain stationary, while the opening moves with respect to the mating part in order to come into the (sealing) engagement. In another example, in the roasting position the opening may remain stationary, while the mating part moves with respect to the opening in order to come into the (sealing) engagement. Thus, the opening can be very well closed in the roasting position, so that in particular (hot) air and/or other by-products of the coffee roasting (smoke, coffee chaffs, dirt, etc.) are effectively prevented from moving via the opening out of the chamber.

The chamber may comprise a sidewall, wherein the distal end of the sidewall defines the opening. As such, an easily accessible opening for accessing the chamber via the opening is provided. The distal end of the sidewall may be slanting such that the opening extends obliquely with respect to the sidewall. Thus, the slanted distal end of the sidewall results in an upper portion of the sidewall being prolonged, e.g. forming a ramp. The obliquely extending opening can be brought very easily into the (sealing) engagement with the mating part, in particular without requiring any relative movement between the opening and the mating part in the roasting position.

In the bean discharge position, the chamber may be arranged to discharge by gravity the coffee beans from the chamber via the opening. Therefore, no additional means or at least a reduced energy of additional means is required for discharging the coffee beans from the chamber. In the bean discharge position, the opening is thus preferably oriented (i.e. tilted, in particular further tilted than in the bean reception position) downwards.

In the bean reception position, the chamber may be arranged to receive by gravity the coffee beans in the chamber via the opening. A user of the apparatus can therefore easily fill the chamber with coffee beans from above the opening. As such, a very convenient filling of the chamber with coffee beans is provided. In the bean reception position, the opening is thus preferably oriented (i.e. tilted) upwards.

In the bean discharge position, the device may be adapted to provide a current of air in order to discharge the coffee beans from the chamber via the opening. The current of air therefore in particular supports the discharging of coffee beans by gravity. The current of air, generated by the device, may be the same current of air for roasting the coffee beans in the roasting position. The current of air may be, however, also a different current of air, such as a current of air dedicated for discharging the coffee beans. The current of air dedicated for discharging the coffee beans may therefore be weaker (i.e. have less energy) than the current of air for roasting/agitating the coffee beans.

The apparatus may further comprise a housing (i.e. an outer casing) for housing at least the chamber and preferably also the device. The housing particularly provides a protection in order to prevent the user from touching possibly hot parts of the chamber. Further, the housing may make the moving chamber blind for the user of the apparatus, thereby providing an improved design of the apparatus.

The housing may comprise a bean reception opening and a bean discharge opening, wherein the bean reception opening and the bean discharge opening are arranged such that the opening of the chamber can be selectively aligned with the bean reception opening or the bean discharge opening. The housing thus facilitates the filling of coffee beans into the chamber and the discharging of coffee beans from the chamber by way of the housing, namely by way of the bean reception opening and the discharge opening. Therefore, the housing may effect that only by way of the bean reception opening and the bean discharge opening the chamber is accessible for the user of the apparatus. As such, an improved design and an improved safety of the apparatus is achieved.

The device may be arranged to generate a current of air in order to agitate the coffee beans received in the chamber. In other words, the device may be arranged to generate a fluid bed in the chamber, wherein this fluid bed includes the agitating coffee beans. In particular, agitating the coffee beans in the roasting position of the chamber is advantageous for roasting the coffee beans.

The apparatus may be a home appliance apparatus (i.e. a home appliance device). The apparatus may thus have a design for being used in a kitchen of a household, e.g. arranged next to and/or integrated with a coffee grinder and/or a beverage preparation machine. For example, the apparatus is an in-home solution, which particularly allows a fresh and/or personalized roast of coffee beans. With the apparatus, a home (coffee) roasting solution may thus be provided.

According to a further aspect of the invention, a method for roasting coffee beans in a chamber is provided. The chamber is provided for receiving coffee beans for roasting, wherein the chamber comprises an opening. The method comprises the steps of: with respect to a movement axis, positioning the chamber in a bean reception position; receiving, in the bean reception position of the chamber, coffee beans in the chamber via the opening; moving with respect to the movement axis the chamber into a roasting position; roasting, in the roasting position, the coffee beans received in the chamber; moving with respect to the movement axis the chamber into a bean discharge position; and discharging, in the bean discharge position, the coffee beans via the opening from the chamber.

The advantages and description with respect to the apparatus apply analogously to the method.

The method may further include the step of, for positioning the chamber in the bean reception position, moving the chamber with respect to the movement axis into the bean reception position.

4. DESCRIPTION OF PREFERRED EMBODIMENTS

In the following, the invention is described exemplarily with reference to the enclosed figures, in which.

Figure 1:
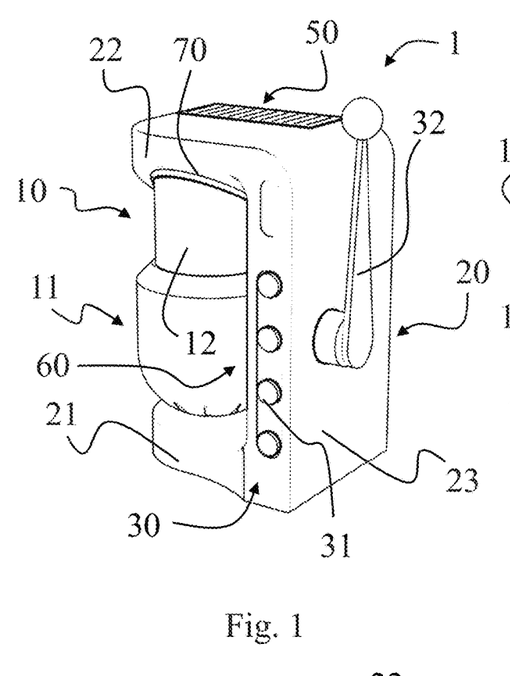
FIG. 1 shows a schematic perspective view of an apparatus according to a first preferred embodiment of the invention, wherein the chamber of the apparatus is in the roasting position.
Figure 2:
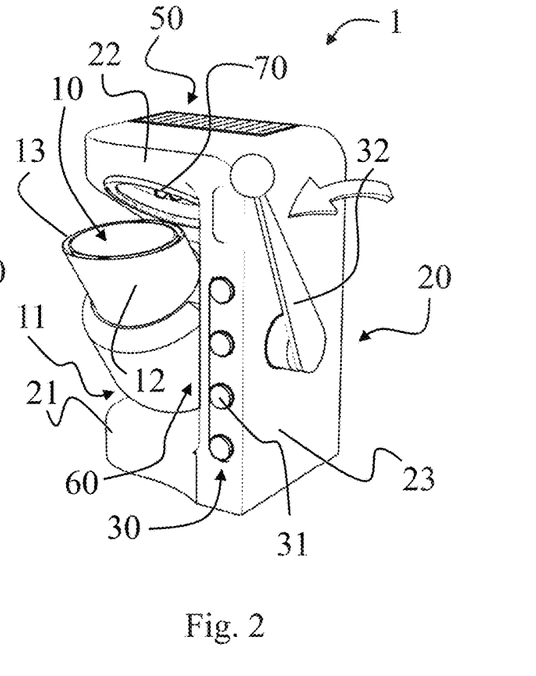
FIG. 2 shows a schematic perspective view of the apparatus according to the first preferred embodiment, wherein the chamber is in the bean reception position.
Figure 3:
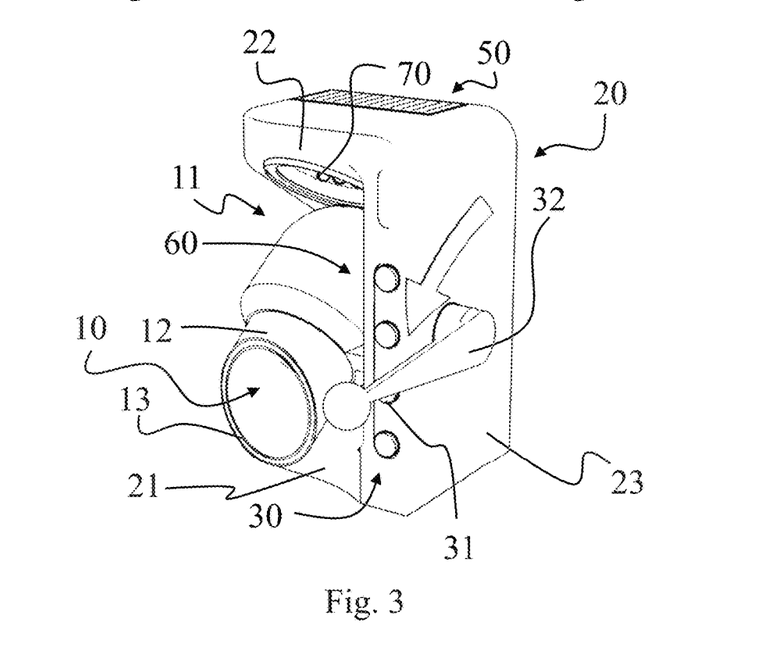
FIG. 3 shows a schematic perspective view of the apparatus according to the first preferred embodiment, wherein the chamber is in the bean discharge position.
Figure 4:
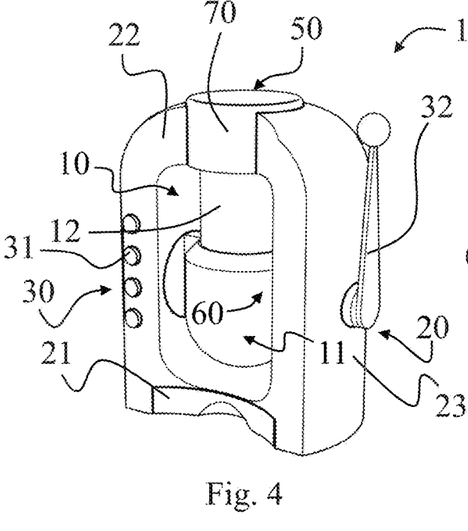
FIG. 4 shows a schematic perspective view of an apparatus according to a second preferred embodiment of the invention, wherein the chamber of the apparatus is in the roasting position.

In FIGS. 1 to 3, a first preferred embodiment of an apparatus 1 is exemplarily shown. The apparatus 1 is adapted for roasting coffee beans. More specifically, the apparatus 1 is adapted to transform unroasted coffee beans, for example in the form of green and/or dried coffee beans, into roasted coffee beans. More specifically, the roasting of the coffee beans transforms the chemical and physical properties of the unroasted coffee beans in order to produce the characteristic flavor of the roasted coffee beans and, thus, of the coffee beverage, which is prepared from the so roasted coffee beans. That is, the roasting of the coffee beans effects the specific taste of roasted coffee beans, for example, by a Maillard reaction and other chemical reactions. The process of roasting the coffee beans therefore precedes other processes required for preparing the coffee beverage, such as coffee grinding and/or coffee brewing, e.g. coffee extraction.

The apparatus 1 may be adapted for collecting chaffs of the so roasted coffee beans. That is, the unroasted coffee beans typically have a (green and/or dried) skin, in particular when it is first picked off the coffee tree. The chaff may also be referred to as husk of the coffee bean. During roasting of the coffee beans, this skin comes off the coffee beans and thus remains as chaffs. That is, in particular the high temperature of roasting allows the chaffs to be easily removed from the coffee beans, without the need of additional work. Since it is desired that this chaffs of the so roasted coffee beans does not remain with the roasted coffee beans, because, for example, the consumer does not wish to have the chaffs inside of the grinder and/or beverage preparation machine and, thus, inside of the coffee beverage, the chaffs may be collected by the apparatus 1 such that the chaffs will not remain with the finished product, which is the roasted coffee beans.

The apparatus 1 may be adapted for small-scale coffee roasting (i.e. on-site coffee roasting) and is thus in particular not a large-scale (industrial) roasting apparatus or machine. The apparatus 1 is thus particularly suitable for being used on the side of the business to business (e.g. a coffee shop) or on the side of the business to consumer and/or of the side of the customer, which is typically the consumer of the coffee beverage. Therefore, the apparatus 1 is preferably a home appliance apparatus. As such, the apparatus 1 may be used in a household or kitchen, in particular on a tabletop, e.g. next to or (functionally) integrated with a coffee grinder and/or a beverage preparation machine. The apparatus 1 therefore preferably has a size and weight for being transportable by a single person, in particular without the need of a dedicated transport mechanism.

The apparatus 1 comprises a chamber 10, in which coffee beans can be received for roasting. The chamber 10 is optionally detachably arranged. The chamber 10 may be designed as a tank or container. The chamber 10 may be delimited by a sidewall 12, which may extend from a bottom 11 that also delimits the chamber 10. Therefore, when the coffee beans are received in the chamber 10, the coffee beans are preferably supported on the bottom 11 and are at least in part in contact with the sidewall 12. The chamber 10 has a design so that in particular heat and/or heated air can come in contact with the (unroasted) coffee beans in order to roast the coffee beans; for example, the bottom 11 and/or the sidewall 12 is made of a material with a relatively high heat conductivity, e.g. a material comprising or consisting of metal. The bottom 11 and/or the sidewall 12 may comprise one or more holes (i.e. vents), which facilitate that heat and/or a current of air (for heating and/or for cooling) can flow into the chamber 10 to accordingly process the coffee beans. The sidewall 12 may comprise vents for the ventilation of the inside of the chamber 10. The vents may be evenly distributed along the sidewall 12.

The chamber 10 comprises an opening 13 for accessing the chamber 10. As such, via the opening 13, coffee beans can be at least removed from the chamber 10. The opening 13 also facilitates that coffee beans can be inserted into the chamber 10, i.e. the chamber 10 may be filled with coffee beans by way of the opening 13. The opening 13 preferably defines an accessing direction for removing coffee beans from the chamber 10 and also for inserting coffee beans into the chamber 10. The opening 13 is not limited to a specific form. The opening 13 is preferably defined by the sidewall 12, e.g. by the distal end of the sidewall 12. Thus, the opening 13 may be arranged opposite to the bottom 11. For example, the opening 13 may extent in a plane. The opening 13 may have a form corresponding to the bottom 11 and/or may have a round (circular, elliptical, etc.) form, however may also have different forms, e.g. a polygonal, rectangular, or square form. The chamber 10 is not limited to a specific form. For example, the chamber 10 has a symmetrical or asymmetrical form. As shown in the figures, the chamber 10 may have at least in part the form of a cylinder.

The apparatus 1 may further comprise a housing 20 for housing at least the chamber 10. The housing 20 may at least in part cover the chamber 10. The housing 20 may cover the chamber 10, when viewed in a top view of the apparatus 1 and/or one or more side views of the apparatus 1. The housing 20 may at specific parts of the housing 20, such as at the front side and/or at one or more lateral side, not cover the chamber 10, so that in particular an access to the chamber 10 is provided. For example, the housing 20 has a base (bottom) 21 and a top 22, wherein the chamber 10 can be arranged such that the opening 13 is arranged at the top 22 of the housing 20. The base 21 may be adapted for positioning and/or mounting the apparatus 1 such that the apparatus 1 can be properly operated (in the operating position). Thus, the base 21 maybe, for example, adapted to be placed on a tabletop or the same. The housing 20 may comprise a sidewall 23, which extends from the bottom 21 to the top 22 and preferably partially surrounds the chamber 10. The housing 20 is not limited to a specific form. The housing 20 may have a non-symmetrical or symmetrical form. For example, the housing 20 has substantially the form of a box, a cuboid, a cylinder or a (truncated) cone.

The apparatus 1 further comprises a device (not shown; e.g. comprising a fan) for generating a current of air inside of the chamber 10. This current of air may be used for roasting the coffee beans, which are received in the chamber 10. For example, the apparatus 1 or the device may further comprise a heater (heating unit), which heats up (fresh) air, wherein the device transports this heated up air into the chamber 10. The current of (hot) air therefore comes into contact with the coffee beans and thus roasts the coffee beans. The current of air may be also such that the coffee beans inside of the chamber 10 are agitated or moved, in particular in order to improve the roasting of the coffee beans. Additionally or alternatively, the current of air generated by the device may be used for cooling the (already roasted) coffee beans received in the chamber 10. For example, for cooling the coffee beans, the current of air may be not heated up (by the heater), but only transport (fresh) air such as ambient air. Thus, for providing the current of air for cooling, the device may simply remain in an activated state, whereas the heater is simply put in a deactivated state, i.e. turned off.

The apparatus 1 may also comprise a control unit. The control unit may be adapted to accordingly control the roasting of the coffee beans, e.g. according to a preprogrammed program, e.g. including a predefined roasting and/or temperature profile. The control unit may be functionally connected to the device and/or the heater so that the device and/or heater accordingly roast and/or cool the coffee beans received by the chamber 10.

The apparatus 1 may comprise a user interface 30, which is preferably functionally connected to the control unit. The user interface 30 facilitates that the user of the apparatus 1 can accordingly control the apparatus 1, in particular for roasting the coffee beans and/or for terminating roasting of the coffee beans. The user interface 30 may comprise one or more (e.g. only four) control elements 31, e.g. in the form of one or more buttons or other touch sensitive elements (touchscreen, etc.), for controlling the apparatus 1. For example, the one or more control elements 31 comprise an element for starting the roasting process and an element for stopping or terminating the roasting process. The control elements 31 may also comprise a control element for powering up (and turning off) the apparatus 1 (e.g. an on/off control element). Stopping of the roasting process may be also automatically carried out by the control unit, e.g. after a predetermined (roasting) time has lapsed. The user interface 30 is preferably arranged on a front side of the apparatus 1, i.e. a user side of the apparatus 1. The device, the control unit, and/or the user interface 30 may be provided in or on the housing 20. As shown in FIGS. 1 to 3, the user interface 30 may be arranged on the housing 20, in particular on a front side of the housing 20. The user interface 30 may be laterally arranged with respect to the chamber 10.

The apparatus 1 may further comprise a power inlet, e.g. in the form of a power plug. By way of the power inlet, the parts of the apparatus 1 requiring energy, such as electrical energy (voltage and/or current), in particular the device, the control unit, and/or the user interface 30, can be supplied with energy. The power plug may be provided on a rear side of the apparatus 1 and/or on the housing 20.

The apparatus 1 may further comprise a chaffs collector 50 for collecting the chaffs of the coffee beans, which are roasted by the chamber 10. The chaffs collector 50 may comprise a compartment, in which the chaffs are collected and prevented from returning to the chamber 10. For example, the chaffs collector 50 may comprise an inlet, which allows only a unidirectional flow of the chaffs so that the chaffs are collected by the chaffs collector 50; thus, the inlet may allow a flow of the chaffs 50 into the compartment, but prevent a flow of the chaffs out of the compartment 51, in particular towards the chamber 10. In order to provide a particularly good collection of the chaffs by the chaffs collector 50, the chaffs collector 50 and the (current of air generating) device can be accordingly arranged to one another. For example, the device can be arranged such that the current of air, which is generated by the device, drives the chaffs of the coffee beans towards the chaffs collector 50, such that (in the roasting position, see below) the chaffs are collected by the chaffs collector 50. The chaffs collector 50 may be designed to selectively open the chaffs collector 50 or, if present, the compartment in order to throw away or otherwise use the collected chaffs. The chaffs collector 50 may be detachably arranged, so that the chaffs collector 50 can be detached from the apparatus 1, e.g. in order to easily throw away the chaffs. For example, the chaffs collector 50 is detachably mounted to the housing 20 (for example on the top side or rear side of the housing 20), e.g. by an accordingly designed joint. The chaffs collector 50 may form the top of the apparatus 1 and/or is arranged at the top 22 of the housing 20.

As shown in FIGS. 1 to 3, the chamber 10, and thus the opening 13 and preferably also the sidewall 12, is movable with respect to a (specific) movement axis. By moving the chamber 10 with respect to the movement axis, the chamber can therefore be moved into at least three different positions, which are shown in FIGS. 1 to 3, respectively. More specifically, these different positions comprise in this preferred embodiment, or consist of, a roasting position (FIG. 1), a bean reception position (FIG. 2), and a bean discharge position (FIG. 3). In other embodiments, the chamber 10 may be also moveable in only two different positions, which are the roasting position and the bean discharge position. In such an alternative embodiment, the reception of the coffee beans may be done in the roasting position. For example, the apparatus 1 may comprise a lid or cover, which, when the apparatus 1 is in the roasting position, can selectively cover (close) or uncover (open) the opening 13 so that in an uncovered state of the opening 13 beans can be received, via the opening 13, in the chamber 10. Roasting is then carried out, when the opening 13 is covered by the lid. Unless otherwise stated, the following explanations with respect to the preferred embodiment comprising the chamber 10, which according to this embodiment is moveable into at least three different positions, applies analogously to the embodiment comprising only two different positions.

The movement axis is preferably a movement axis, which is fixed with respect to the apparatus 1. That is, the movement axis is preferably provided such that the movement axis as such cannot be moved relative to specific parts of the apparatus 1, such as the housing 20 and/or base (i.e. bottom) 21. As shown in FIGS. 1 to 3, the movement axis may extend horizontally. The movement axis may extend perpendicular to at least part of the housing 20, such as perpendicular to a lateral part of the housing 20, which is, for example, the sidewall 23 of the housing 20. The lateral part of the housing 20 may extend in the vertical, such as in a vertical plane. In other embodiments, the movement axis may also extend vertically.

The movably arranged chamber 10 facilitates that only with one type of movement (e.g., rotational or linear) with respect to the movement axis, the chamber 10 can be moved into the at least three different positions. As shown in FIGS. 1 to 3, this type of movement may be a rotational movement. Accordingly, the movement axis may be a rotational movement axis. The chamber 10 is therefore preferably rotatably movable into the at least three different positions. By rotationally moving the chamber 10 about the (rotational) movement axis, the user of the apparatus 1 can thus move the chamber 10 into each of the at least three different positions. In other embodiments, the chamber 10 may be also linearly movable into the at least three different positions.

For providing the movement axis, the apparatus 1 may comprise one or more link (joint) elements 60. The one or more link elements 60 therefore provide the degree of freedom, i.e. the type of movement, which is provided by the movement axis. Thus, the one or more link elements 60 may effect (only) a rotational type of movement. The one or more link elements 60 may connect the chamber 10, such as a (outer side of the) sidewall 12 of the chamber 10, with a fixed part of the apparatus 1, such as with the housing 20, so that by way of the one or more link elements 60 the chamber 10 is movably arranged, in particular relative to said fixed part of the apparatus 1, in order to move into the at least three different positions. The one or more link elements 60 may be connected only to one section of the chamber 10, e.g. of the sidewall 12 and/or of the bottom 11. The one or more link elements 60 may be also connected to more than one sections of the chamber 10, such as to two diametrically opposed sections of the chamber 10, e.g. of the sidewall 12.

The at least three different positions, i.e. the roasting position, the bean reception position and the bean discharge position are three dedicated positions, i.e. positions, which are defined by the apparatus 1. The apparatus 1 may be configured to stop or brake the chamber, when the chamber is in each of the at least three different positions. For example, the apparatus 1 may comprise one or more stop elements, preferably arranged on or integrally formed with the housing 20, in order to stop the chamber 10 in one or more of the at least three different positions. For example, one of the stop elements may be arranged such that, when the chamber 10 is in the roasting position (see FIG. 1), the chamber 10 is stopped and can be moved with respect to the movement axis only in one direction, e.g. towards the bean reception position and bean discharge position. This stop element, defining the roasting position, may be arranged at the top 22 of the housing 20, e.g. integrally formed with the top 22. Additionally or alternatively, (a further) one of the stop elements may be arranged such that, when the chamber 10 is in the bean discharge position (see FIG. 3), the chamber 10 is stopped and can be moved with respect to the movement axis only in one direction, e.g. towards the bean reception position and roasting position. This stop element, defining the bean discharge position, may be arranged at the bottom 21 of the housing 20, e.g. integrally formed with the bottom 21.

The apparatus 1 may comprise one or more braking elements in order to brake the chamber 10 in one or more of the at least three different positions. Each of the one or more braking elements may be arranged to stop a movement of the chamber 10 with respect to the movement axis in a specific direction, when a force for accordingly moving the chamber 10 (e.g. a manipulation force) is below a defined threshold value. When this force for accordingly moving the chamber 10 is at or above the defined threshold value, the one or more braking elements may be arranged to allow the movement of the chamber in said specific direction. The apparatus 1 may be configured to brake the chamber 10, when the chamber 10 is in the bean reception position. Thus, the apparatus 1 may comprise for the bean reception position one or more braking elements. More specifically, when the chamber 10 is moved, with a specific force below said threshold value, out of the roasting position or bean discharge position and towards the bean reception position, the one or more braking elements may brake the chamber 10 such that the chamber 10 is stopped in the bean reception position. When this force for accordingly moving the chamber 10 is at or above the defined threshold value, the one or more braking elements thus allow the movement of the chamber 10 out of the bean reception position, e.g. towards the roasting position or the bean discharge position. The one or more braking elements may arranged on the housing 20 and/or may be provided with the one or more link elements 60.

FIG. 1 exemplarily shows the roasting position of the chamber 10. In the roasting position, the device (for roasting the coffee beans) is arranged to roast the coffee beans received in the chamber 10. In the roasting position, the device therefore provides the (heated) current of air in order to roast and preferably agitate the coffee beans received in the chamber 10. In the roasting position, the opening 13 of the chamber 10 is therefore preferably closed, thereby in particular re-directing the flow towards the top part of the apparatus 1, such as towards the mating part 70 and/or the chaffs collector 50, and/or avoiding that (hot) air and/or other by-products of the coffee roasting (smoke, dirt, coffee chaffs, etc.) can escape the chamber 10 to an outside of the apparatus 1. If present, the chaffs collector 50 may, in the roasting position, collect the coffee chaffs and preferably also other by-products, which result from the roasting of the coffee beans. In the roasting position, the chamber 10, for example an (symmetrical) axis of the chamber 10, may extend in the vertical direction, and/or the accessing direction of the opening 13 may extend in the vertical direction.

The apparatus 1 may comprise a mating part 70 for covering and preferably engaging with the opening 13 in the roasting position. Thus, the mating part 70 closes and preferably seals the chamber 10 for roasting the coffee beans in the roasting position. The mating part 70 is preferably arranged in the top 22 of the housing 20. As shown in FIGS. 1 to 3, the mating part 70 may be integrally formed with the housing 20. For sealing the chamber 10, the mating part 70 may comprise a sealing element. In the roasting position, the distal end of the sidewall 12, which defines the opening 13, may be engaged with and/or pressed against the mating part 70, such as the sealing element. The mating part 70 may comprise the chaffs collector 50, and/or the top 22 may comprise both the chaffs collector 50 and the mating part 70, for example integrally formed with one another. The mating part 70 may at the same time be the stop element, which defines the roasting position.

FIG. 2 exemplarily shows the chamber 10 in the bean reception position, in this position, the chamber 10 is arranged to receive, via the opening 13, coffee beans for subsequent roasting in the roasting position (see FIG. 1). The bean reception position, as exemplarily shown in FIG. 2, is therefore preferably the starting position for the process of coffee roasting. In the bean reception position, the device for roasting the coffee beans is therefore preferably deactivated. In the bean reception position, the chamber 10 is preferably arranged to receive, by gravity, the coffee beans in the chamber 10 via the opening 13. The coffee beans can therefore be simply filled, via the opening 13, into the chamber 10 by using gravity. The user of the apparatus 1 can therefore fill the chamber 10 with coffee beans from above the opening 13. As shown in FIG. 2, the opening 13 is preferably oriented upwards in the bean reception position. As such, the opening 13 is, in the bean reception position, easily accessible for the user of the apparatus. In the bean reception position, the chamber 10, such as a (symmetrical) axis of the chamber 10, is preferably oblique with respect to the vertical direction. In other words, the accessing direction defined by the opening 13 is preferably oblique with respect to the vertical. The angle between this axis (respectively accessing direction) and the vertical direction is preferably smaller than 90°, for example about 45°. In the bean reception position, the opening 13 may be partially covered, i.e. semi open. For example, parts of the apparatus 1, such as of the housing 20 (e.g. of the top 22), partially cover the opening 13 in the bean reception position. When viewed along a specific direction, such as in a top view of the apparatus 1, i.e. along the vertical direction, the opening 13 may be partially covered, e.g. by the housing 20, preferably the top 22.

In general, the opening 13 may be arranged such that, when the chamber 10 moves (for example from the bean reception position shown in FIG. 2) into the roasting position (as shown in FIG. 1), the opening 13 moves towards the mating part 70 in order to come into the engagement with the mating part 70 in the roasting position, which is preferably a sealing engagement. Such an arrangement of the opening 13 can be seen in FIGS. 2 and 3. As shown in FIG. 2, such an arrangement of the opening 13 may be provided by slanting the distal end of the sidewall 12. Thus, due to the slanted distal end of the sidewall 12, the opening 13 extends obliquely with respect to the sidewall 12. That is, the slanting of the sidewall 12 defines a plane, which is not perpendicular but oblique with respect to the sidewall 12, and which comprises the opening 13. Thus, by moving the chamber 10 (e.g. from the bean reception position) into the roasting position the opening 13 moves towards the mating part 70 and then comes, due to the obliquely extending opening 13, into the (sealing) engagement with the mating part 70 in the roasting position. The opening 13, i.e. the slanted distal end of the sidewall 12, is then preferably engaged and/or pressed against the mating part 70, effecting the (sealing) engagement with the mating part 70. The mating part 70 may at least in part extend correspondingly or complementary to the opening 13 and the distal end of the sidewall 12, respectively. As shown in FIGS. 2 and 3, the mating part 70 may therefore at least in part extend obliquely.

FIG. 3 exemplarily shows the chamber 10 in the bean discharge position. In the bean discharge position, the chamber 10 is arranged such that the coffee beans can be discharged via the opening 13 from the chamber 10. As shown in FIG. 3, the chamber 10 may be arranged, in the bean discharge position, to discharge by gravity the coffee beans from the chamber 10 via the opening 13. In the bean discharge position, the opening 13 is therefore preferably arranged to be oriented downwards. In the bean discharge position, a container or any other receiving element, such as for receiving roasted coffee beans for a further processing, may be arranged at least in part below the opening 13. Thus, the (roasted) coffee beans can be easily discharged from the chamber 10 via the opening 13 into the container/receiving element by using gravity. In the bean discharge position, the chamber 10, such as the (symmetrical) axis of the chamber 10, may extend obliquely with respect to the vertical direction. In other words, the accessing direction defined by the opening 13 may extend obliquely to the vertical direction. The angle between the chamber 10 (e.g. its (symmetrical) axis) respectively accessing direction of the opening 13 and the vertical direction may be greater than 90°, for example in the range from 120° to 160°, such as 135°. In the bean discharge position, the opening 13 is thus fully opened. Thus, the coffee beans, being discharged from the chamber 10, can be discharged via the full extent of the opening 13.

In the bean discharge position, discharging the coffee beans from the chamber 10 may be carried out by using only gravity, thereby not requiring any additional means or energy for removing the coffee beans from the chamber 10. However, in the bean discharge position, the device (for roasting the coffee beans) may be also activated in order to provide a current of air in order to discharge the coffee beans from the chamber 10 via the opening 13. As such, the current of air, generated by the device, may support the discharging of coffee beans by using gravity. The device may provide the current of air for discharging the coffee beans such that this current of air is weaker than the current of air for roasting the coffee beans received in the chamber. In other words, the current of air, generated by the device for discharging the coffee beans, may be a gentle current of air. Since this current of air is only used for discharging the coffee beans, the device may be adapted to avoid heating this current of air in the bean discharge position.

In the preferred embodiment shown in FIGS. 1 to 3, the chamber 10 is adapted to move manually into each of the at least three different positions, i.e. the roasting position, the bean reception position, and the bean discharge position. As shown in FIGS. 1 to 3, the apparatus 1 may comprise a user interface 32 and/or the user interface 30, such as one or more of the control elements 31, for manually moving the chamber 10 into each of the at least three different positions. The user interface 32 may be handle (lever). The handle may be designed for being grasped by a user's hand. The handle may extent longitudinally. In the roasting position of the chamber 10, as shown in FIG. 1, the user interface 32, preferably formed as the handle, may extent (longitudinally) in the vertical direction. In the bean reception position of the chamber 10, as shown in FIG. 2, the user interface 32/handle may extent obliquely with respect to the vertical direction. In the bean discharge position of the chamber 10, as shown in FIG. 3, the user interface 32/handle may extend obliquely to the vertical direction or substantially in the horizontal direction. By turning the user interface 32 (with respect to defined angles), the chamber 10 may therefore be moved into the at least three different positions. The user interface 32 may be arranged on the housing 20, such as on a lateral side of the housing 20, for example on the sidewall 23. The user interface 32 may directly connect to the chamber 10 for the manual movement of the chamber 10, e.g. by way of the one or more link elements 60.

The chamber 10 is, however, not limited to be adapted to move only manually into each of the at least three different positions. Additionally or alternatively, the chamber 10 may be also adapted to move automatically into each of the at least three different positions. For such an automatic movement of the chamber 10, a (electrical) driving unit (not shown) may be provided. The driving unit may be functionally connected to the control unit and the movable chamber 10. The control unit may therefore control the driving unit, e.g. based on the roasting process, such as based on certain parameters of the roasting process (e.g., ending of the roasting process, and/or presence of (dried) coffee beans in the chamber 10), to automatically move the chamber 10 into the desired one of the at least three different positions.

While the chamber 10 moves into each of the at least three different positions, the device for roasting of the coffee beans may remain stationary or may move together with the chamber 10. For example, the device may be accommodated in the housing 20 for remaining stationary during the movement of the chamber 10. If the device is arranged to move together with the chamber 10, the device and the chamber 10 may be together accommodated in a common accommodation part. The device may be arranged (or accommodated) in or below the bottom 11 of the chamber 10. By providing the device for roasting the coffee beans such that the device moves together with the chamber 10 may effect that the common center of gravity of the device and the chamber 10 is offset with respect to the movement axis. This offset provision of the common center of gravity, i.e. the so effected twisting movement, may be used for more easily moving of the chamber 10 into one or more of the different positions, such as into the roasting position and/or bean discharge position, and/or for effecting that the chamber 10 remains in one or more of the different positions, such as in the roasting position and/or bean discharge position.

FIGS. 4 to 7 show a second preferred embodiment of the apparatus 1. The second embodiment of the apparatus 1 substantially corresponds to the first preferred embodiment, unless otherwise specified in the following. The description with respect to the first embodiment of the apparatus 1 therefore applies analogously to the second preferred embodiment of the apparatus 1. Same reference signs correspond to same features. The second preferred embodiment of the apparatus 1 differs from the first preferred embodiment of the apparatus 1 in particular in that the mating part 70 and the opening 13 are relatively movable to one another, when the chamber 10 is in the roasting position. This is exemplarily shown in FIG. 5. By moving the mating part 70 and the opening 13 relatively to one another in the roasting position, the opening 13 and the mating part 70 can come into the engagement with one another, which is preferably a sealing engagement. As mentioned before, this engagement of the opening 13 with the mating part 70 is advantageous in the roasting position of the chamber 10, since (hot) air and/or other by-products of the coffee roasting (dirt, smoke, coffee chaffs, etc.) is prevented from escaping the chamber 10 via the opening 13.

Figure 5:
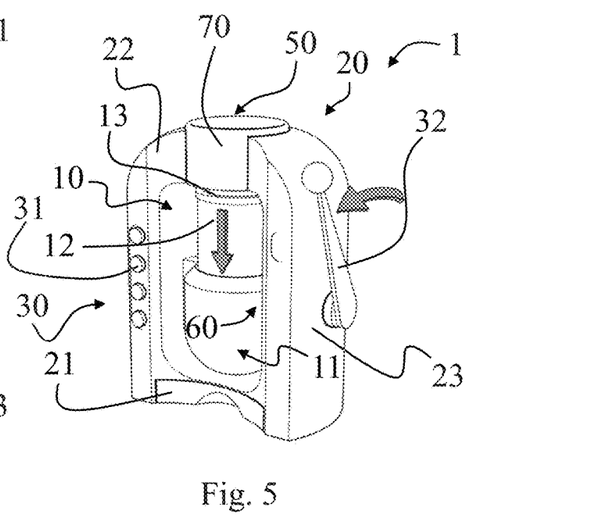
FIG. 5 shows a schematic perspective view of the apparatus according to the second preferred embodiment in the roasting position, wherein the opening of the chamber is moved relative to the stationary mating part in order to disengage the opening from the mating part.
Figure 6:
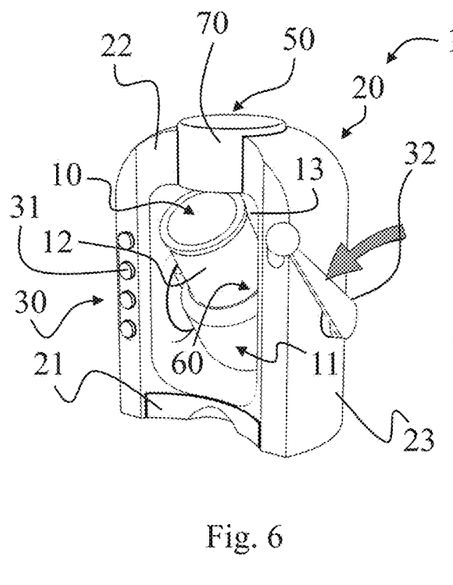
FIG. 6 shows a schematic perspective view of the apparatus according to the second preferred embodiment, wherein the chamber is in the bean reception position.
Figure 7:
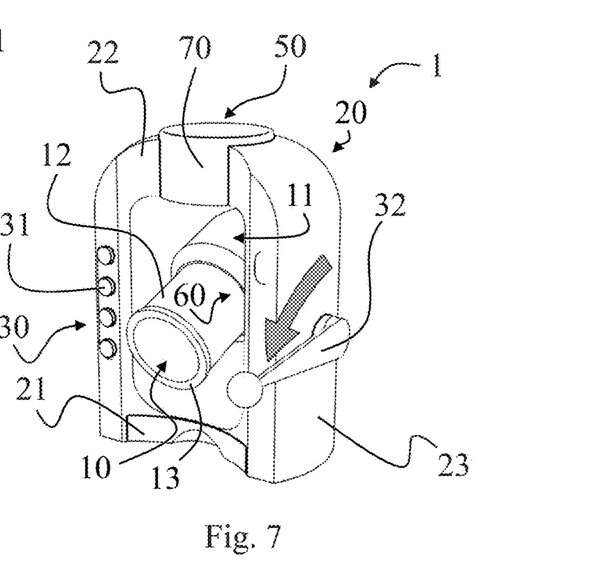
FIG. 7 shows a schematic perspective view of the apparatus according to the second preferred embodiment, wherein the chamber is in the bean discharge position.
Figure 8:
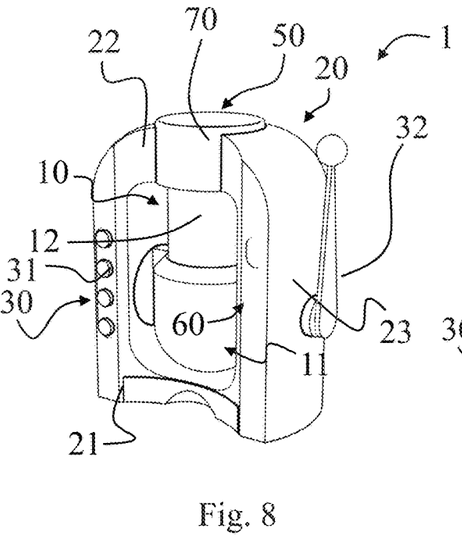
FIG. 8 shows a schematic perspective view of an apparatus according to a third preferred embodiment of the invention, wherein the chamber of the apparatus is in the roasting position.

As shown in FIG. 5, the relative movement between the mating part 70 and the opening 13 may be provided by the opening 13 being movable with respect to the stationary mating part 70, when the chamber 10 is in the roasting position. Therefore, the sidewall 12, which defines the opening 13, e.g. with its distal end, may be provided to be movable in order to provide the movable opening 13 with respect to mating part 70 in the roasting position. The apparatus 1 may therefore have, besides the (first) movement axis for moving the chamber 10 into the at least three different positions, a further (second) movement axis in order to move the opening 13 respectively sidewall 12 relative to the mating part 70. The relative movement between the opening 13 and the mating part 70 may be a linear movement so that the further movement axis may be a linear movement axis. The further movement axis may extend in a vertical direction, when the chamber 10 is in the roasting position. The opening 13 and in particular the sidewall 12 may therefore be relatively movable with respect to one or more parts of the chamber 10, such as with respect to the bottom 11 of the chamber 10.

As shown in FIG. 5, the opening 13 may therefore disconnect or disengage from the mating part 70—thereby opening (i.e. uncovering) the opening 13 (for example in order to allow air to escape from the chamber 10)—, by moving away from the mating part 70. This movement of the opening 13 may therefore be a (linear) downwards movement. Correspondingly, the opening 13 may connect or engage with the mating part 70—thereby closing (i.e. covering) the opening 13 by the mating part 70 (for example in order to prevent at least air from escaping from the chamber 10)—, by moving towards the mating part 70. This movement of the opening 13 may therefore be a (linear) upwards movement.

Before the chamber 10 moves from the roasting position (see FIGS. 4 and 5) into the bean reception position (see FIG. 6) or bean discharge position (see FIG. 7), the opening 13 and the mating part 70 may move relative to one another in order to disengage from one another. The user interface 32 may be arranged both to move the chamber 10 with respect to the movement axis and to move the opening 13 and the mating part 70 relative to one another (with respect to the further movement axis). Thus, the user interface 32 may be arranged to combine both a rotational movement (for the chamber 10) and a linear movement (for the opening 13 and the mating part 70 moving relative to one another). For example, the user interface 32 may be arranged such that, when the user interface 32 is manipulated for moving the chamber 10 out of the roasting position (e.g. into the bean discharge or bean reception position), the opening 13 and the mating part 70 are firstly moved relative to one another (thereby disengaging the opening 13 from the mating part 70), wherein subsequently to this relative movement of the opening 13 and the mating part 70 the chamber 10 is then moved out of the roasting position, e.g. into the bean reception position or bean discharge position.

FIGS. 8 to 11 show a third preferred embodiment of the apparatus 1. The third embodiment of the apparatus 1 substantially corresponds to the first and second preferred embodiment, respectively, unless otherwise specified in the following. The description with respect to the first and second embodiment of the apparatus 1 therefore applies analogously to the third preferred embodiment of the apparatus 1. Same reference signs correspond to the same features. The third preferred embodiment of the apparatus 1 differs from the second preferred embodiment of the apparatus 1 in particular in that the relative movement between the mating part 70 and the opening 13 is provided by the mating part 70 being movable with respect to the stationary opening 13, when the chamber 10 is in the roasting position. The previously mentioned further (second) movement axis is therefore defined by the mating part 70 being moveably arranged in order to move the opening 13 and the mating part 70 relative to one another. As such, the mating part 70 may be relatively movable with respect to one or more parts of the apparatus 1, such as with respect to the housing 20, in particular the top 22.

Figure 9:
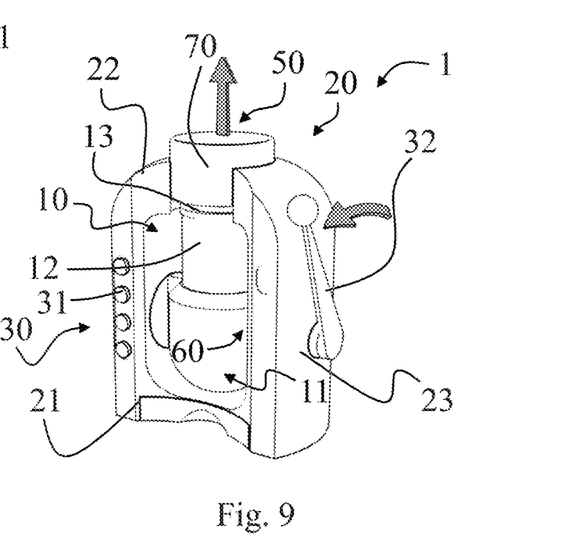
FIG. 9 shows a schematic perspective view of the apparatus according to the third preferred embodiment in the roasting position, wherein the mating part is moved relative to the stationary opening of the chamber in order to disengage the opening from the mating part.
Figures 10, 11:
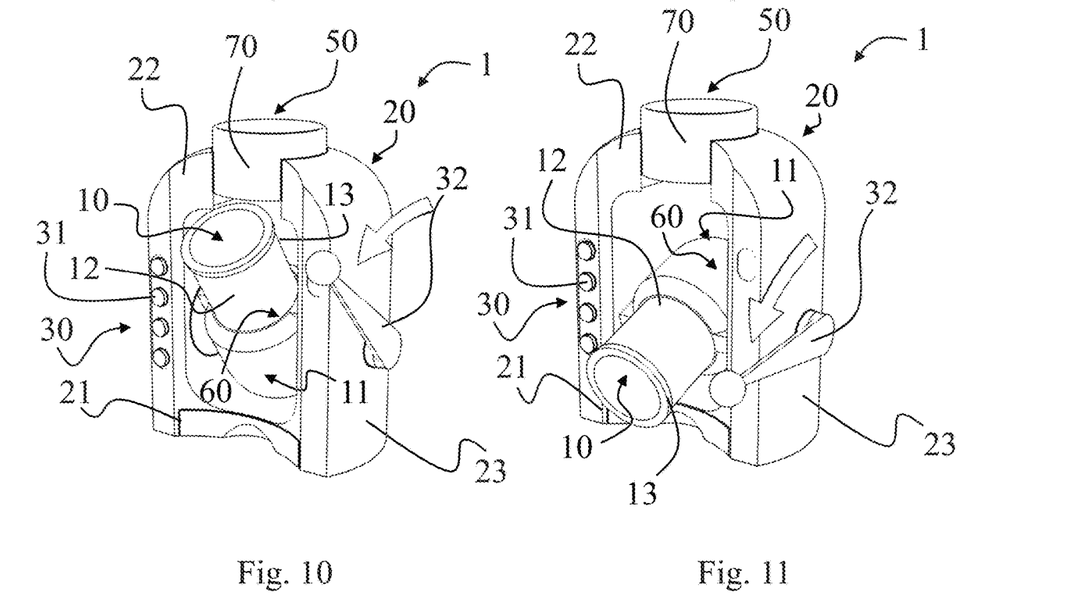
FIG. 10 shows a schematic perspective view of the apparatus according to the third preferred embodiment, wherein the chamber is in the bean reception position.
FIG. 11 shows a schematic perspective view of the apparatus according to the third preferred embodiment, wherein the chamber is in the bean discharge position.

As shown in FIG. 9, the mating part 70 may therefore, in the roasting position of the chamber 10, disconnect or disengage from the opening 13—thereby opening (i.e. uncovering) the opening 13 (for example in order to allow air to escape from the chamber 10)—, by moving away from the opening 13. This movement of the mating part 70 may therefore be a (linear) upwards movement. Correspondingly, the mating part 70 may connect or engage, in the roasting position, with the opening 13—thereby closing (i.e. covering) the opening 13 by the mating part 70 (for example in order to prevent air from escaping from the chamber 10)—, by moving towards the opening 13. This movement of the mating part 70 may therefore be a (linear) downwards movement.

The second and third embodiment of the apparatus 1 may be also combined. Thus, the relative movement between the opening 13 and the mating part 70 is provided by moving both the opening 13 and the mating part 70. In other words, for the relative movement between the opening 13 and the mating part 70, none of the opening 13 and the mating part 70 may remain stationary. The mating part 70 may be in general provided as a lid and/or may be designed to comprise the chaffs collector 50. The mating part 70 may be received in the housing 20, such as to be (linearly) movable with respect to the housing 20, in particular for effecting the relative movement with respect to the opening 13. Having the relative movement between the opening 13 and the mating part 70 for the engagement/disengagement, it is not required to have the distal end of the sidewall 12 to be slanted. Thus, the opening 13, i.e. the plane, in which the opening 13 extends, may extend perpendicular to the sidewall 12 of the chamber 10. Therefore, a simpler manufacturing of the chamber 10 is achieved, since the sidewall 12 is not required to be slanted. Further, the perpendicular extension of the opening 13 with respect to the sidewall 12, i.e. a horizontal extension in the roasting position, allows an improved sealing, in particular due to the flat connection.

Figure 12:
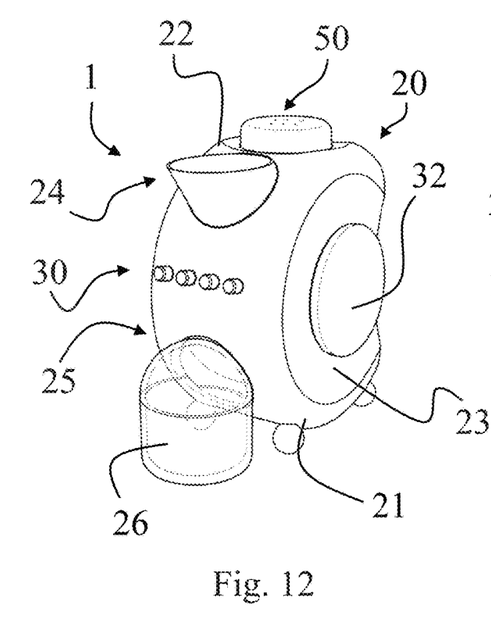
FIG. 12 shows a schematic perspective view of an apparatus according to a fourth preferred embodiment of the invention, in which the apparatus comprises an optional housing.
Figure 13:
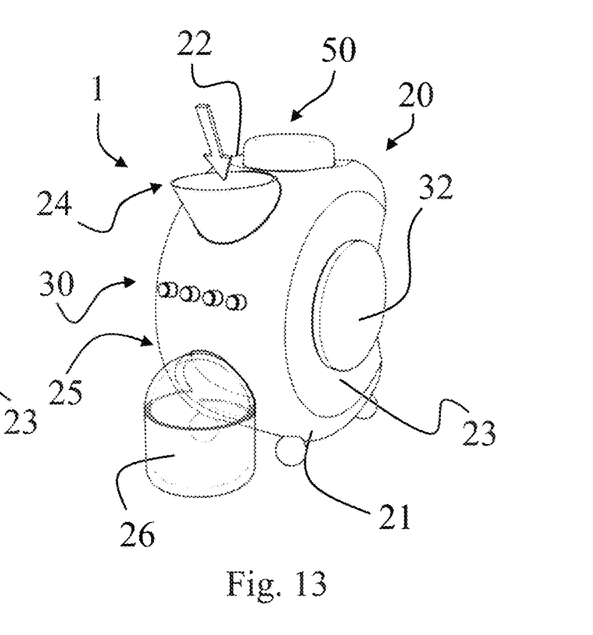
FIG. 13 shows a schematic perspective view of the apparatus according to the fourth embodiment, wherein the chamber is in the bean reception position.
Figure 14:
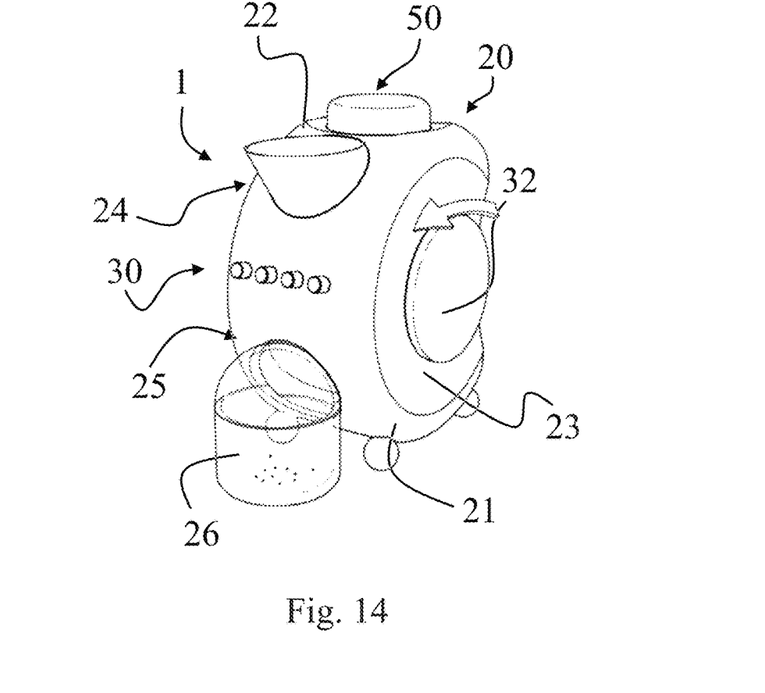
FIG. 14 shows a schematic perspective view of the apparatus according to the fourth embodiment, wherein a user interface, optionally provided as a knob, is operated.

As shown in FIGS. 12 to 14, the apparatus 1 may comprise the housing 20 such that the housing 20 houses or accommodates the chamber 10. The housing 20 may therefore be provided such that the chamber 10 is not visible from outside of the apparatus 1, i.e. not visible for the user of the apparatus 1. The housing 20 may thus surround the chamber 10 on all sides. This increases the safety of the apparatus 1, since the risk of the user touching the (possibly hot) chamber 10 is eliminated or at least significantly reduced. The housing 20, however, still facilitates that coffee beans can be filled into the chamber 10 and that coffee beans can be discharged from the chamber 10. For this reason, the housing 20 may comprise a bean reception opening 24 and a bean discharge opening 25. Thus, the opening 13 of the chamber 10 can be selectively aligned with the bean reception opening 24 (see FIG. 13; bean reception position) or bean discharge opening 25 (see FIG. 14; bean discharge position). Hence, by filling coffee beans into the bean reception opening 24, optionally provided with a filling support such as a hopper, the coffee beans move via the opening 13, aligned with the bean reception opening 24, into the chamber 10.

In the bean discharge position of the chamber 10 (see FIG. 14), the opening 13 is thus aligned with the bean discharge opening 25. Hence, coffee beans can be discharged from the chamber 10 via the opening 13 and subsequently via the bean discharge opening 25. With respect to the discharging direction of the coffee beans from the chamber 10 and, thus, out of the bean discharge opening 25, a receiving element 26 may be arranged downstream of the bean discharge opening 25. The receiving element 26 may be at least in part arranged below the bean discharge opening 25. The receiving element 26 is adapted to collect the coffee beans, which are discharged from the chamber 10 in the bean discharge position. The receiving element 26 may be arranged to forward the so collected (e.g. roasted) coffee beans for further processing, e.g. in a coffee grinder and/or a beverage preparation machine. The receiving element 26 may be detachably connected to the housing 20. Thus, the receiving element 26 may be manipulated in order to remove the so collected coffee beans and/or to clean the receiving element 26. The connection between the receiving element 26 and the bean discharge opening 25 may be sealed, e.g. with a dedicated sealing element, in order to prevent the coffee beans, which are discharged via the opening 25 into the receiving element 26, from jumping out of the receiving element 26 and to an outside of the apparatus 1. The connection between the receiving element 26 and the bean discharge opening 25 may be provided by an angle element. The receiving element 26 may be a (collecting) container.

As shown in FIGS. 12 to 14, the user interface 30 may be provided on a front side of the housing 20. For example, the user interface 30 is arranged between the bean reception opening 24 and the bean discharge opening 25, in particular when viewed in a front view of the apparatus 1. In the embodiment shown in FIGS. 12 to 14, the housing 20 has at least in part a form in the form of a cylinder. The openings 24, 25 and preferably the user interface 30 may be arranged on the shell surface of the housing 20, which is for example the cylinder surface of the housing 20. The user interface 32 is preferably arranged on a lateral side of the housing 20, which is, if the housing 20 has the optional cylindrical form, the at least in part circular surface. As shown in FIGS. 12 to 14, the user interface 32 may have the form of a knob and/or a form corresponding at least in part to the form of the housing 20.

It should be clear to a skilled person that the embodiments shown in the figures are only preferred embodiments, but that, however, also other designs of an apparatus 1 can be used.

The invention claimed is:

1. An apparatus for roasting coffee beans, the apparatus comprising:
   a chamber in which coffee beans can be received for roasting, wherein the chamber comprises an opening,
   a device comprising a heater to heat air and a fan to transport the heated air into the chamber to roast the coffee beans received in the chamber,
   a housing partially surrounding the chamber, and
   a mating part for covering and engaging with the opening in the roasting position in order to close and seal the chamber for roasting the coffee beans such that the heated air flows out of the chamber through the mating part;
   wherein the chamber is movable with respect to a movement axis into different positions, wherein these positions comprise a roasting position, a bean discharge position, and a bean reception position, wherein
   in the roasting position the device is arranged to roast the coffee beans received in the chamber,
   in the bean discharge position the chamber is arranged such that the coffee beans can be discharged via the opening from the chamber, and
   in the bean reception position the chamber is arranged to receive, via the opening, coffee beans for subsequent roasting in the roasting position, wherein in the bean reception position the chamber is tilted at an angle between the roasting position and the bean discharge position.

2. The apparatus according to claim 1, wherein the chamber is rotatably movable into the different positions, and/or wherein the movement axis extends horizontally.

3. The apparatus according to claim 1, wherein the chamber is adapted to move manually into each of the different positions, and wherein the apparatus further comprises a user interface for manually moving the chamber into each of the different positions.

4. The apparatus according to claim 1, wherein the opening is arranged such that, when the chamber moves into the roasting position, the opening moves towards the mating part in order to come into an engagement with the mating part in the roasting position.

5. The apparatus according to claim 1, wherein, when the chamber is in the roasting position, the mating part and the opening are relatively movable to one another so that the opening and the mating part can come into an engagement with one another.

6. The apparatus according to claim 1, wherein the chamber comprises a sidewall, and wherein the distal end of the sidewall defines the opening.

7. The apparatus according to claim 1, wherein in the bean discharge position the chamber is arranged to discharge by gravity the coffee beans from the chamber via the opening.

8. The apparatus according to claim 1, wherein in the bean discharge position the device is adapted to provide a current of air in order to discharge the coffee beans from the chamber via the opening.

9. The apparatus according to claim 1, wherein the housing comprises a bean reception opening and a bean discharge opening, wherein the bean reception opening and the bean discharge opening are arranged such that the opening of the chamber can be selectively aligned with the bean reception opening or the bean discharge opening.

10. The apparatus according to claim 1, wherein the device is arranged to generate a current of air in order to agitate the coffee beans received in the chamber.

11. The apparatus according to claim 1, wherein the apparatus is integrated with a coffee grinder and/or a beverage preparation machine.

12. Method for roasting coffee beans in a chamber in which coffee beans can be received for roasting, wherein the chamber comprises an opening, the method comprising the steps of:
   receiving coffee beans in the chamber via the opening while the chamber is in a bean reception position,
   roasting, in a roasting position, the coffee beans received in the chamber,
   moving, with respect to a movement axis, the chamber into a bean discharge position,
   discharging, in the bean discharge position, the coffee beans via the opening from the chamber, and
   moving, with respect to the movement axis, the chamber into the roasting position, wherein in the bean reception position the chamber is tilted at an angle between the roasting position and the bean discharge position.

13. The method according to claim 12, further comprising the step of moving, with respect to the movement axis, the chamber into the bean reception position.

* * * * *